(12) United States Patent
Ishige

(10) Patent No.: US 7,386,219 B2
(45) Date of Patent: Jun. 10, 2008

(54) VIDEO DATA RECORDING APPARATUS AND VIDEO DATA RECORDING METHOD

(75) Inventor: Masafumi Ishige, Kanagawa (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 09/972,816

(22) Filed: Oct. 5, 2001

(65) Prior Publication Data

US 2002/0057894 A1    May 16, 2002

Related U.S. Application Data

(63) Continuation of application No. PCT/JP01/00864, filed on Feb. 7, 2001.

(30) Foreign Application Priority Data

Feb. 8, 2000    (JP)    ............................. 2000-030528

(51) Int. Cl.
*H04N 5/93*    (2006.01)

(52) U.S. Cl. ........................ 386/55; 386/52; 386/109; 386/111; 386/112; 386/27; 386/33

(58) Field of Classification Search ................. 386/55, 386/52, 109, 111–112, 27, 33
See application file for complete search history.

(56) References Cited

U.S. PATENT DOCUMENTS

| | | | |
|---|---|---|---|
| 5,488,433 A * | 1/1996 | Washino et al. | ............ 348/722 |
| 5,852,435 A | 12/1998 | Vigneaux et al. | |
| 5,982,982 A * | 11/1999 | Ono et al. | .................. 386/109 |
| 6,414,725 B1 * | 7/2002 | Clarin et al. | ................. 348/714 |
| 2001/0055336 A1 * | 12/2001 | Krause et al. | .......... 375/240.11 |
| 2002/0094193 A1 * | 7/2002 | Tao et al. | ...................... 386/52 |

FOREIGN PATENT DOCUMENTS

| | | |
|---|---|---|
| EP | 0 634 876 | 1/1995 |
| EP | 0 909 089 | 4/1999 |
| JP | 8-279922 | 10/1996 |
| JP | 11-136631 | 5/1999 |
| JP | 11-187349 | 7/1999 |

(Continued)

*Primary Examiner*—Thai Q. Tran
*Assistant Examiner*—Helen Shibru
(74) *Attorney, Agent, or Firm*—Frommer Lawrence & Haug LLP; Willam S. Frommer; Thomas F. Presson

(57) ABSTRACT

A time from covering to edit or broadcast is shortened and also management and handling of materials are made simpler.

Encoder 1A compresses digital video signal DVS obtained by camera into encoded data DVA of low resolution. Encoder 1B compresses the digital video signal DVS into encoded data DVB of high resolution. The encoded data DVA of low resolution and encoded data DVB of high resolution are stored in storage medium 4. Moreover, the encoded data DVA of low resolution is transmitted to broadcasting station by transmitter 7 simultaneously with storing in the storage medium 4. In the broadcasting station, edit is performed based on the encoded data DVA of low resolution and edit decision list is transmitted to video recording apparatus. The edit decision list is stored in the storage medium 4. When the storage medium 4 is brought into the broadcasting station, the encoded data DVB of high resolution is broadcast in accordance with edit decision list.

18 Claims, 3 Drawing Sheets

FOREIGN PATENT DOCUMENTS

| | | |
|---|---|---|
| JP | 11-195288 | 7/1999 |
| WO | WO 94 29868 | 12/1994 |
| WO | WO 96 27263 | 9/1996 |
| WO | WO 99 24987 | 5/1999 |
| WO | WO 00 69168 | 11/2000 |
| WO | WO 01 46955 | 6/2001 |

* cited by examiner

VIDEO DATA RECORDING APPARATUS AND VIDEO DATA RECORDING METHOD

This is a continuation of copending International Application PCT/JP01/00864 having an international filing date of 7 Feb. 2001.

TECHNICAL FIELD

The present invention relates to a video recording apparatus for recording materials obtained by taking an image at the scene of gathering materials in a recording medium capable of random access.

BACKGROUND ART

In a conventional video recording apparatus for recording images taken by a camera at the scene of collecting materials together with sounds, the sounds and images have been recorded on a video tape such as a magnetic tape. In this case, the video tape on which the sounds and images are recorded is, for example, brought into a broadcasting station and the like where edit equipments are installed and then editing is performed as follows. The materials (audio and video data) are edited so that they may be put within a predetermined broadcasting time, or incidental text data such as scripts are prepared, or video processing for switching scenes is performed and so on. The thus edited contents are prepared as an edit decision list (EDL). After the edit, the materials will be broadcast in accordance with the edit decision list.

By the way, in the video recording apparatus according to prior art, material tapes must be brought into the broadcasting station and a long time is required from gathering materials through edit to broadcast. This involves a problem. Moreover, in the above editing work, materials of original video tape (material tape) are dubbed in a video tape for that work and the edit decision list is prepared using the video tape for the work (work tape). This raises another problem in which the management and handling of materials will be complex.

Furthermore, in recent years, a nonlinear editing device is employed, in which materials recorded in the material tape are stored in a recording medium capable of random access such as a hard disc device and then the materials are edited on its storage medium. In this case, the editing work itself can be done more simply and besides in a short time as compared with an editing work using the video tape. However, the material tape must also be brought into the broadcasting station and materials recorded on the material tape must be transferred to the storage medium. This also raises the same problem as in the above-mentioned technique, in which a long time is required from gathering materials through edit to broadcast.

Therefore, the object of the present invention is to provide a video data recording apparatus and a video data recording method which are capable of reducing a time required from the gathering to edit or broadcast and also capable of making the management and handling of materials simpler.

DISCLOSURE OF THE INVENTION

To attain the above object, a video data recording apparatus according to the invention set forth in claim 1 comprises:

a first data processing means for compressing inputted video data by a first compression rate to output a first encoded data;

a second data processing means for compressing said inputted video data by a compression rate higher than said first compression rate to output a second encoded data;

a storing means for storing at least said first encoded data outputted from said first data processing means in a storage medium;

a transmitter means for transmitting said second encoded data outputted from said second data processing means to outside; and a receiver means for receiving at least an edit decision list based on said second encoded data inputted from the outside.

In the above video data recording apparatus, said edit decision list received by said receiver means is supplied to said storing means and is stored together with said first encoded data in said storage medium.

A video data recording method according to the invention set forth in claim 6 comprises the steps of:

a first step of compressing inputted video data by a first compression factor to output a first encoded data and also compressing said inputted video data by a second compression factor higher than said first compression factor to output a second encoded data;

a second step of storing at least said first encoded data in a storage medium;

a third step of transmitting said second encoded data to the outside;

a fourth step of receiving at least an edit decision list based on said second encoded data inputted from the outside; and a fifth step of storing said edit decision list received in said fourth step in said storage medium.

In the present invention, predetermined video signals are compressed to form the first encoded data by the first data processing means and also the video signals are compressed to form the second encoded data so that the amount of data may be made smaller than that of the first encoded data by the second data processing means. Then, at least the first encoded data generated by the first data processing means are stored in the storage medium. At this moment, the transmitter means transmits the second encoded data generated by the second data processing means to an editing device different from the present apparatus. Therefore, the recording and editing can be performed almost simultaneously with each other and the time required from the gathering to edit or broadcast can be shortened. Moreover, because it is arranged that the edit decision list indicating edit contents edited by the above editing device is received by the receiver means and then the edit decision list is stored together with the first encoded data in the storage medium, the management and handling of materials can be made simpler.

BEST MODE FOR CARRYING OUT THE INVENTION

An embodiment according to the present invention will be described below with reference to the drawings.

A. Structure of the Embodiment

Figure 1:
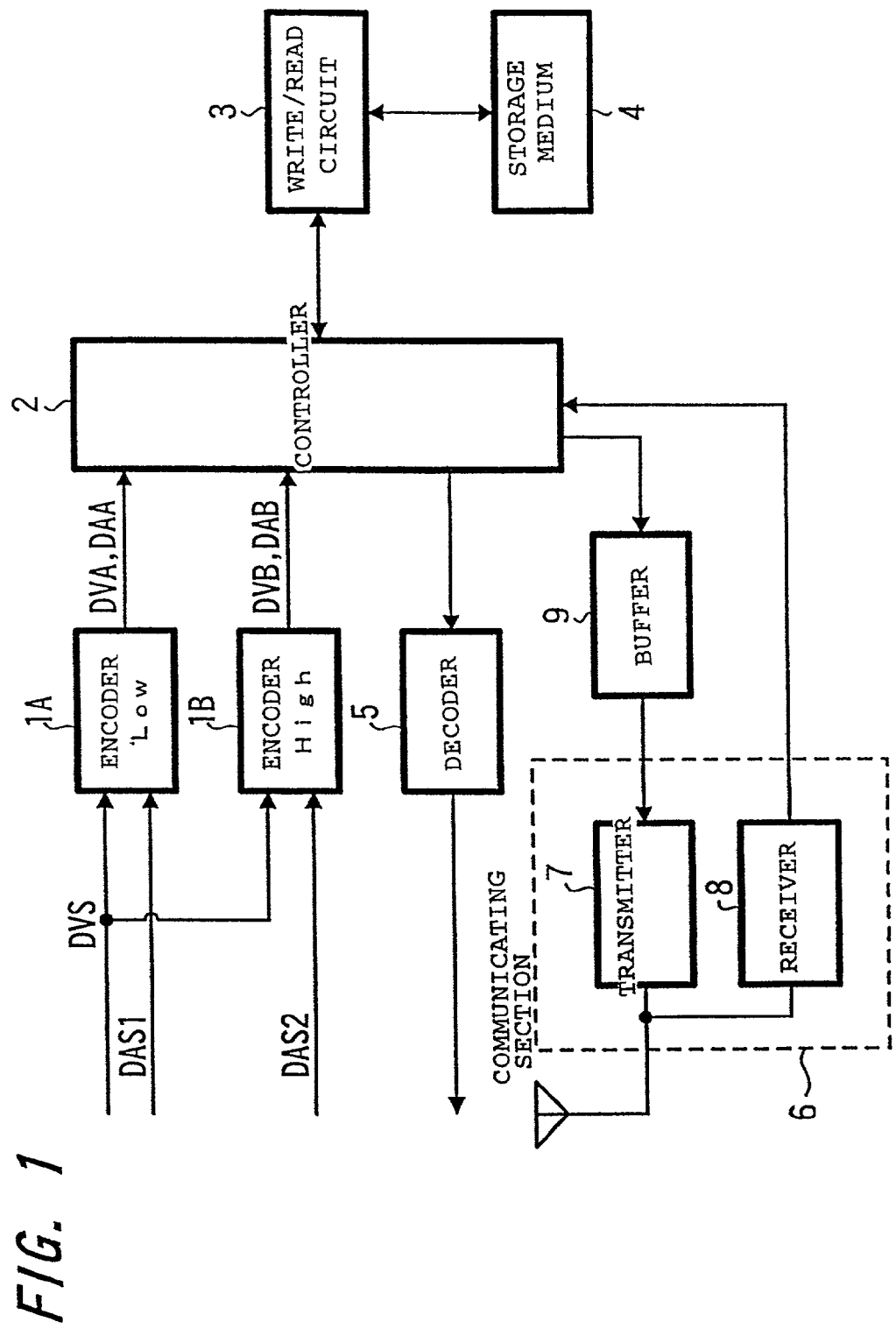
FIG. 1 is a block diagram showing the structure of a recording system of a video recording apparatus according to an embodiment of the present invention.

FIG. 1 is a block diagram showing the structure of a recording system of a video recording apparatus according to an embodiment of the present invention. In this figure, an encoder 1A compresses sequentially digital video signals DVS supplied from a camera unit not shown in accordance with a format prescribed in MPEG (Moving Picture Experts Group) with such a low resolution that the DVS signals may fall within an amount of data which can be transmitted to and received by an editing device, etc. in a remote place without any stress by radio or by wire. The resultant encoded data DVA of low resolution are supplied to a controller 2 and a communicating section 6. Also, the encoder 1A compresses digital audio signals DAS1 of low sound quality, which is acquired by a microphone not shown and sampled at a low sampling rate. The resultant audio data DAA of low sound quality are supplied to the controller 2 and communicating section 6.

Next, an encoder 1B compresses sequentially, in the same way as in the encoder 1A, the digital video signal DVS in accordance with the format prescribed in MPEG with such a high resolution relative to the encoder 1A, that is usable for broadcasting. The resultant encoded data DVB of high resolution are supplied to the controller 2. Also, the encoder 1B compresses digital audio signal DAS2 of high sound quality, sampled at a high sampling rate. The resultant audio data DAB of high sound quality are supplied to the controller 2.

The controller 2 supplies the encoded data DVA of low resolution and the audio data DAA of low sound quality as well as the encoded data DVB of high resolution and the audio data DAB of high sound quality to a write/read circuit 3 on a timeshared basis. Also, the controller 2 supplies the encoded data DVA of low resolution and the audio data DAA of low sound quality or the encoded data DVB of high resolution and the audio data DAB of high sound quality to a decoder 5 and also supplies the encoded data DVA of low resolution and the audio data DAA of low sound quality to the communicating section 6 through a buffer 9.

The write/read circuit 3 stores sequentially the encoded data DVA of low resolution and the audio data DAA of low sound quality as well as the encoded data DVB of high resolution and the audio data DAB of high sound quality, which are supplied on the time shared basis in a storage medium 4. Also, the write/read circuit 3 supplies the encoded data DVA of low resolution and the audio data DAA of low sound quality or the encoded data DVB of high resolution and the audio data DAB of high sound quality which are recorded in the storage medium 4 to the controller 2.

The storage medium 4 is made of a large capacity of storage medium capable of random access, which can record a plurality of materials. The present embodiment uses an optical disc as the storage medium, but the present invention is not limited thereto and may use a magnetic recording medium such as a hard disc device, if it can be miniaturized and have a large capacity.

Next, the decoder 5 expands the encoded data DVA of low resolution and the audio data DAA of low sound quality or the encoded data DVB of high resolution and the audio data DAB of high sound quality supplied from the controller 2. The resultant signals are sent out to external terminals or a viewfinder not shown.

The communicating section 6 includes a transmitter 7 and a receiver 8. The transmitter 7 transmits the encoded data DVA of low resolution and the audio data DAA of low sound quality supplied from the controller 2 through the buffer 9 directly to another computer or a broadcasting station described below, or through a communications satellite to a broadcasting station. Additionally, the buffer 9 is provided for transmitting the encoded data DVA of low resolution and the audio data DAA of low sound quality at a predetermined transmission speed from the transmitter 7. The other computer or broadcasting station equipped with editing machinery or editing means (including software) uses the aforesaid encoded data DVA of low resolution and audio data DAA of low sound quality in order to perform the following edits. Materials (audio and video data) are edited so that they may fall within a predetermined broadcasting time, or incidental text data such as scripts are prepared, or video processing for switching scenes is performed and so on. The thus edited contents are transmitted again to the present recording apparatus as the edit decision list. In this connection, the data transmitted from the transmitter 7 may further include metadata incidental to video and audio data, such as photographing date and time, name of photographer or the like. This will serve for making the edit operation effective based on the contents of this metadata during edit.

The receiver 8 receives the edit decision list with respect to the encoded data DVA of low resolution and the audio data DAA of low sound quality, which is transmitted from the other computer or broadcasting station, and supplies it to the controller 2. In addition, the communicating section 6 may be such one that transmits data using radio channels employed by PHS (Personal Handyphone System) or portable telephone, or using radio or wired channel having a bandwidth other than those which are already employed by some communication system, as long as a bi-directional data transmission is possible. When an analog channel is used, a modem which performs digital-to-analog conversion or analog-to-digital conversion is required. The above described edit decision list is stored in the storage medium 4 through the controller 2 and the write/read circuit 3. Further, the receiver 8 can receive, in addition to the edit decision list, the aforementioned metadata such as editing date and time (into a unit of frame), as well as data on editor's name and informing date and time from the other computer or broadcasting station.

B. Operation of the Embodiment

Figure 2:
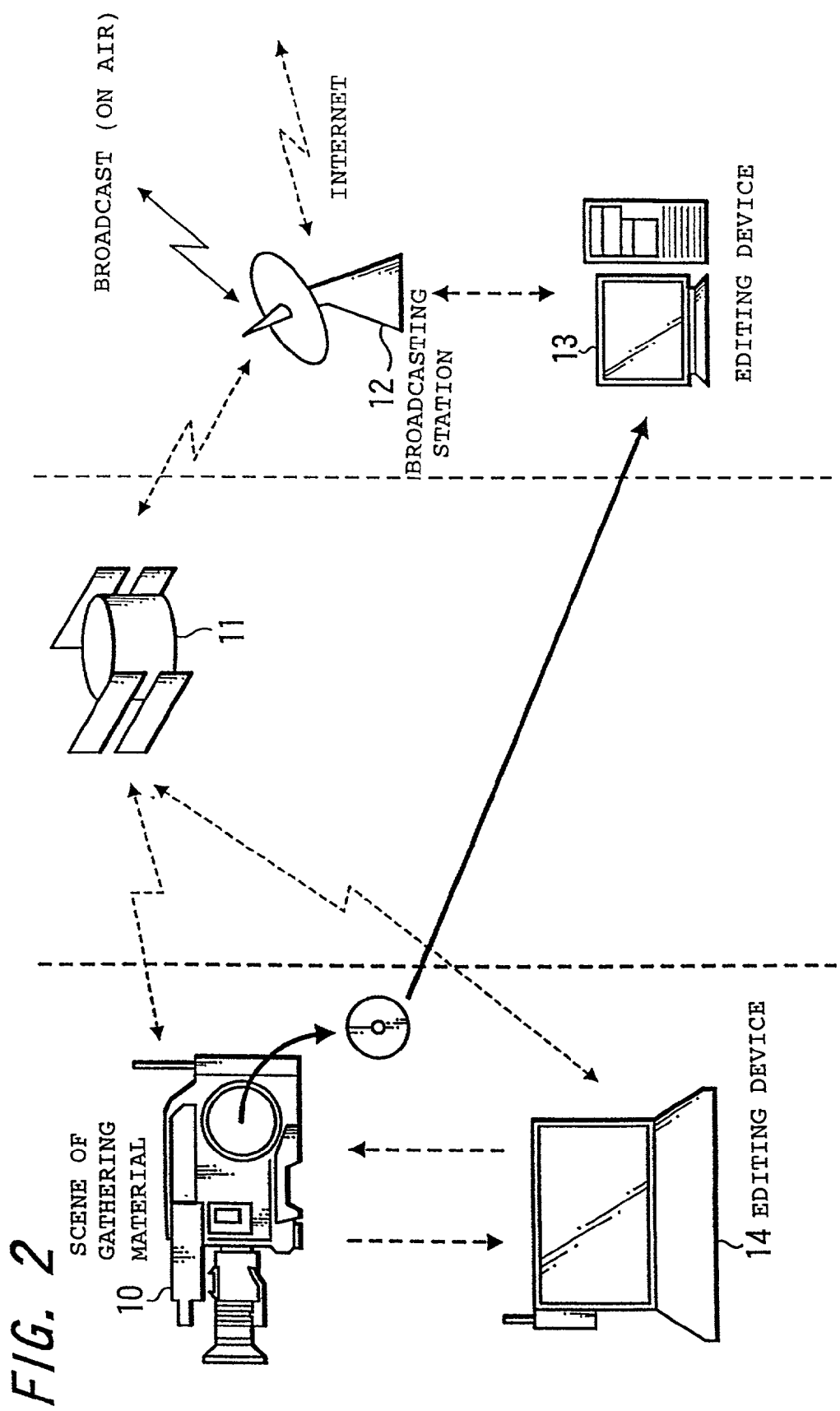
FIG. 2 is a schematic diagram showing a rough structure of a broadcasting system in which a video recording apparatus according to the present embodiment is employed.

Next, the operation of the video recording apparatus according to the above embodiment will be described. FIG. 2 is a schematic diagram showing a rough structure of a broadcasting system in which the video recording apparatus according to the present embodiment is employed. The encoder 1A compresses the digital video signals DVS which are converted to digital data after being acquired by a camera unit not shown, into the encoded data DVA of low resolution. It also compresses the digital audio signals DAS1 of low sound quality which are sampled at a low sampling rate after being acquired by a microphone not shown, into the audio data DAA of low sound quality. These resultant data are both supplied to the controller 2.

Also, the encoder 1B compresses the above digital video signals DVS into the encoded data DVB of high resolution and compresses the digital audio signals DAS2 of high sound quality which are sampled at a high sampling rate, into the audio data DAB of high sound quality. These resultant data are both supplied to the controller 2. The encoded data DVA of low resolution and the audio data DAA of low sound quality as well as the encoded data DVB of high resolution and the audio data DAB of high sound quality are supplied from the controller 2 to the write/read circuit 3 on a time-shared basis. The write/read circuit 3 stores them in the storage medium 4.

Moreover, the encoded data DVA of low resolution and the audio data DAA of low sound quality are also supplied to the transmitter 7 of the communicating section 6 through the buffer 9 simultaneously with storing them in the storage medium 4. The transmitter 7 reads the encoded data DVA of low resolution and the audio data DAA of low sound quality out of the buffer 9 correspondingly to the transmission speed. After modulating the read-out data, the transmitter 7 transmits them, for example, through a communications satellite 11 to a broadcasting station 12. Alternatively, the encoded data DVA of low resolution and the audio data DAA of low sound quality may be read out of the storage medium 4 by the write/ read circuit 3 in response to user's operation after recording and then transmitted by the transmitter 7 of the communicating section 6, besides being transmitted simultaneously with recording.

The broadcasting station 12 receives the encoded data DVA of low resolution and the audio data DAA of low sound quality transmitted by the video recording apparatus 10 and stores them in an editing device 13. The editing device 13 edits the materials (audio and video data) so as to put it within a predetermined broadcasting time, or performs a video processing for changing over a scene, or prepares incidental text data such as scripts. The resultant edited contents are transmitted again to the video recording apparatus 10 through the communications satellite 11 as the edit decision list including the text data. The encoded data DVA of low resolution or/and the audio data DAA of low sound quality after editing may be up-loaded at once from the broadcasting station 12 for use in web pages on the Internet for the purpose of introducing programs or the like.

In addition, the encoded data DVA of low resolution and the audio data DAA of low sound quality may be transmitted, for example, to a computer 14 which is located near editing machinery and has a edit function which enables a producer, etc. to edit while checking recording conditions. In this case, the editing work is performed in that computer 14. Then, the edited contents are transmitted again to the video recording apparatus 10 from the computer 14 as the edit decision list. The video recording apparatus 10 receives the edit decision list by the receiver 8 of the communicating section 6 and stores them in the storage medium 4 through the controller 2 and the write/read circuit 3.

That storage medium 4 is brought into the broadcasting station 12 and then the encoded data DVB of high resolution and the audio data DAB of high sound quality are read out of the storage medium for decoding. The resultant signals are broadcast in accordance with the edit decision list stored.

Additionally, although the encoded data DVA of low resolution and the audio data DAA of low sound quality as well as the encoded data DVB of high resolution and the audio data DAB of high sound quality are stored in the same medium in the above embodiment, it may be arranged that one of them (e.g., the encoded data DVB of high resolution and the audio data DAB of high sound quality) is stored in a storage medium such as an optical disc and the other (e.g., the encoded data DVA of low resolution and the audio data DAA of low sound quality) is stored in another medium such as a semiconductor memory.

Figure 3:
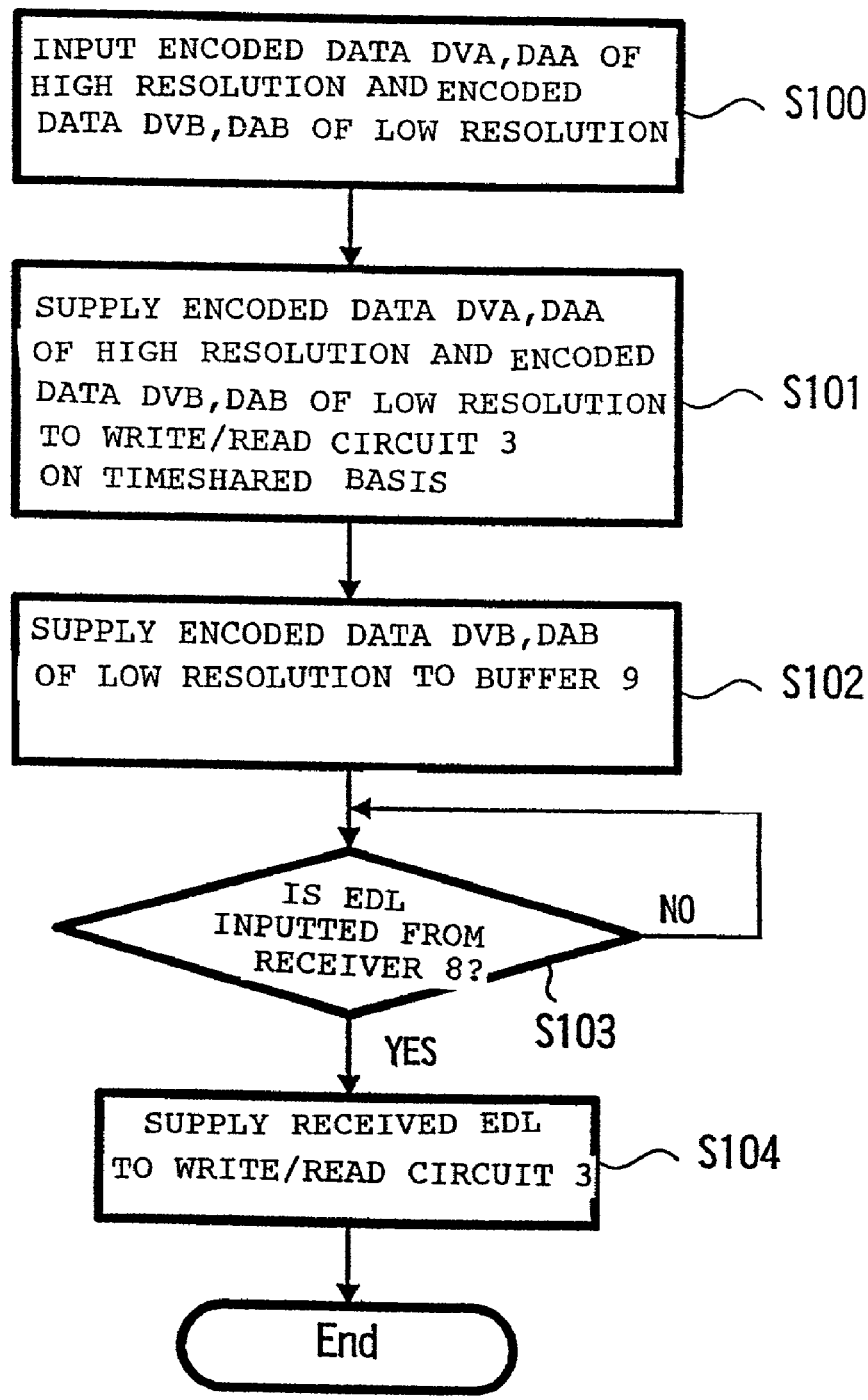
FIG. 3 is a flow chart of processings performed by controller 2 of the video recording apparatus according to the present embodiment.

Next, processings performed by the controller 2 of the video recording apparatus will be described with reference to FIG. 3. FIG. 3 is a flow chart showing a sequence of processings performed by the controller 2 described above. First of all, in step S100, the encoded data DVA, DAA of high resolution and encoded data DVB, DAB of low resolution outputted from the encoder 1A and 1B are inputted. Next, in step S101, the encoded data DVA, DAA of high resolution and encoded data DVB, DAB of low resolution inputted in step S100 are supplied to the write/read circuit 3 on a timeshared basis. Both of the encoded data DVA, DAA and DVB, DAB supplied to the write/read circuit 3 are stored in the storage medium 4.

Next, processing moves to step S102, where the encoded data DVB, DAB of low resolution out of the encoded data inputted in step S100 are supplied to the buffer 9. This step is provided for causing the transmitter 7 to transmit them to the exterior editing device 14. The encoded data DVB, DAB of low resolution are edited in the editing device 14 and then the EDL indicating a result of the editing is inputted to the receiver 8. In step S103, it is decided whether or not the EDL is inputted from the receiver 8 to the controller 2.

The controller 2 repeats the action of step S103 until the EDL is inputted thereto from the receiver 8. When the EDL is inputted from the receiver 8 (in case of YES in step S103), processing moves to step S104, where the received EDL is supplied to the write/read circuit 3. The supplied EDL is stored in the storage medium 4 through the write/read circuit 3, thus making processings come to an end.

According to the above described embodiment, because an editing work can be carried out almost simultaneously with recording, it will be possible to reduce a time required for obtaining the edited materials from its recording. Moreover, because the preparation of scripts or the up-loading to web pages of the Internet is enabled based on the encoded data DVA of low resolution and the audio data DAA of low sound quality, it will be possible to realize a prompt distribution of information. Furthermore, because the storage medium 4 is a nonlinear device, a cheap existing communication network such as asynchronous public channel or computer network, etc. can be employed for transmission, so that it can be realized at low cost. In addition, because the materials of high resolution, the edit decision list, scripts and other various information on materials which are used for broadcast are stored in a single storage medium 4, a collective management is enabled. Accordingly, the management and handling of materials can be made simpler. Further, because the materials used in edit are the data of low resolution, even if there is only a channel of narrow bandwidth, a high speed transfer will be possible.

INDUSTRIAL APPLICABILITY

The present invention is applicable to a video recording apparatus in which the editing work is performed almost simultaneously with recording. Moreover, the preparation of scripts or the up-loading to web pages of the Internet using the edited material is enabled. Furthermore, a communication channel network such as asynchronous public channel or computer network can be utilized for transmission.

The invention claimed is:
1. A video data recording apparatus comprising:
first data processing means for compressing inputted video data at a first compression rate to output first encoded data;
second data processing means for compressing said inputted video data at a second compression rate, the second compression rate being higher than said first compression rate to output second encoded data;
storing means for storing at least said first encoded data and said second encoded data;
transmitting means for transmitting said second encoded data outputted from said second data processing means; and
receiver means for receiving at least an edit decision list based on said transmitted second encoded data;
wherein said edit decision list received by said receiver means is supplied to said storing means and is stored with said first encoded data in said storing means,
wherein said first encoded data are retrieved from said storing means and broadcast in accordance with said edit decision list,
wherein said second encoded data is stored by said storing means and substantially simultaneously transmitted by said transmitting means, and
wherein the first data processing means, second data processing means, storing means and transmitting means perform their respective functions substantially simultaneously.

2. The video data recording apparatus according to claim 1, wherein
said receiver means receives, with said edit decision list, incidental data to said second encoded data.

3. The video data recording apparatus according to claim 1, wherein
said transmitter means transmits, with said second encoded data, incidental data to said second encoded data.

4. The video data recording apparatus according to claim 2, wherein
said incidental data and said second encoded data are script data.

5. The video data recording apparatus according to claim 1, wherein
said storing means is a recording medium capable of random access.

6. A video data recording method comprising the steps of:
a first compressing step for compressing inputted video data by a first compression ratio to output a first encoded data;
a second compressing step for compressing said inputted video data by a second compression ratio higher than said first compression ratio to output a second encoded data;
storing at least said first encoded data and said second encoded data;
transmitting said second encoded data;
receiving at least an edit decision list based on said second encoded data;
storing said edit decision list received in said receiving step;
reading said first encoded data; and
broadcasting said first encoded data in accordance with said edit decision list,
wherein said second encoded data is stored and transmitted substantially simultaneously,
wherein the first compressing step, second compressing step, storing step and transmitting step perform their respective functions substantially simultaneously.

7. The video data recording method according to claim 6, further comprising:
receiving incidental data with said edit decision list.

8. The video data recording method according to claim 6, further comprising:
transmitting incidental data with said second encoded data.

9. The video data recording method according to claim 7, wherein
said incidental data and said second encoded data are script data.

10. The video data recording method according to claim 6, further comprising:
randomly accessing stored data.

11. A video data recording apparatus comprising:
first data processing means for processing first encoded data corresponding to inputted video data;
second data processing means for processing second encoded data corresponding to said inputted video data and having lower resolution than a resolution of said first encoded data;
storing means for storing at least said first encoded data and said second encoded data;
transmitter means for transmitting said second encoded data;
receiver means for receiving an edit decision list based on said second encoded data;
output means for outputting said first encoded data; and
broadcast means for broadcasting the encoded data according to said edit decision list,
wherein said second encoded data is stored by said storing means and substantially simultaneously transmitted by said transmitting means,
wherein the first data processing means, second data processing means, storing means and transmitter means perform their respective functions substantially simultaneously.

12. The video data recording apparatus according to claim 11, wherein said storing means stores said edit decision list received by said receiver means.

13. A video data recording apparatus according to claim 12, wherein said storing means stores said edit decision list in an identical storage medium.

14. The video data recording apparatus according to claim 11, wherein
said first data processing means generates said first encoded data by compressing said inputted video data by a first compression rate;
said second data processing means generates said second encoded data by compressing said inputted video data by a compression rate higher than said first compression rate.

15. A method of recording video data comprising the steps of:
a first outputting step for outputting first encoded data corresponding to inputted video data;
a second outputting step for outputting second encoded data corresponding to said inputted video data and having a resolution lower than the resolution of said first encoded data;
storing at least said first encoded data and said second encoded data;
transmitting said second encoded data;
receiving an edit decision list based on said second encoded data;
reading out said first encoded data; and
broadcasting said first encoded data in accordance with said edit decision list,
wherein said second encoded data is stored and transmitted substantially simultaneously, wherein the first outputting step, second outputting step, storing step and transmitting step perform their respective functions substantially simultaneously.

16. The method of claim 15, further comprising the step of storing the received edit decision list.

17. The method of claim 16 further comprising:
storing the edit decision list in an identical storage medium as said first encoded data.

18. The method of claim 15, further comprising:
generating said first encoded data by said inputted video data by a first compression rate; and
generating said second encoded data by compressing said inputted video data by a compression rate higher than said first compression rate.

* * * * *